Patented July 7, 1953

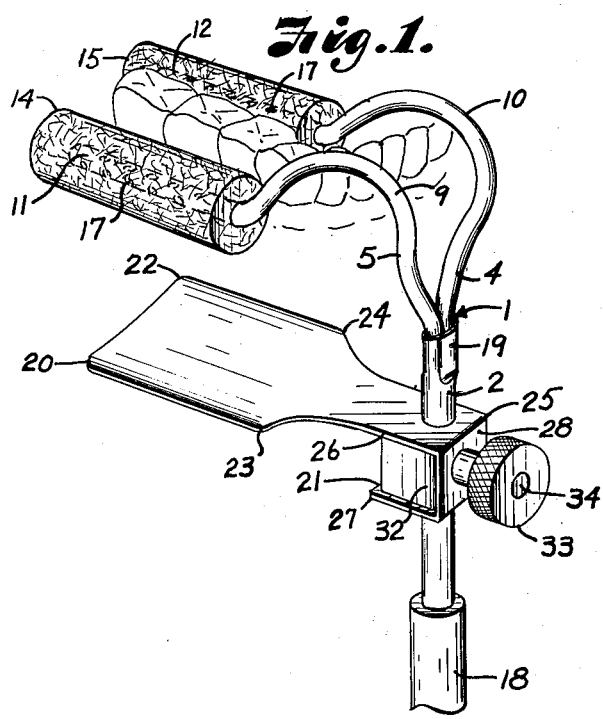
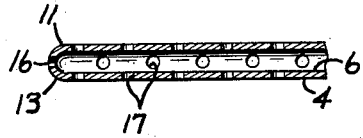
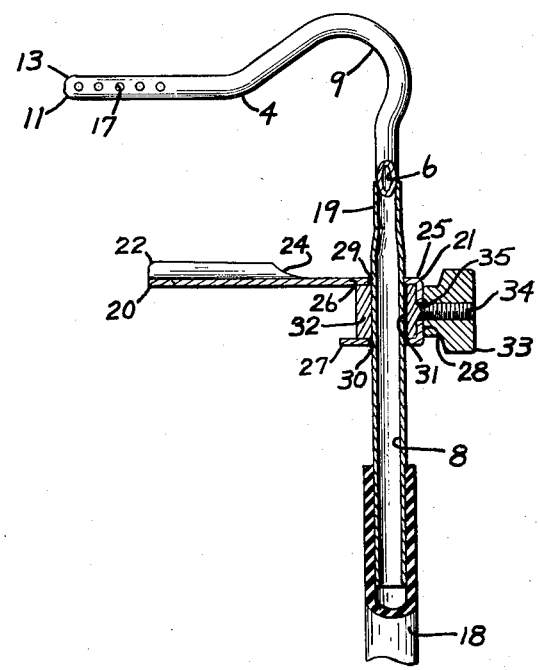
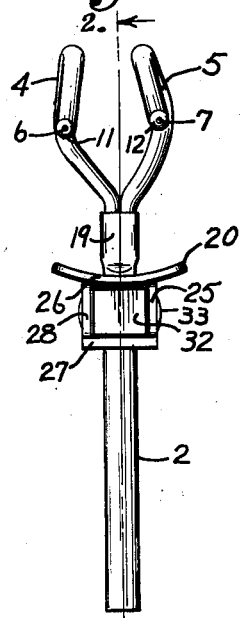
July 7, 1953 — J. E. SCOTT — 2,644,234
INSTRUMENT FOR REMOVING SALIVA
Filed April 7, 1952
INVENTOR.
Joseph Earl Scott.
ATTORNEYS.

2,644,234

UNITED STATES PATENT OFFICE 2,644,234

INSTRUMENT FOR REMOVING SALIVA

Joseph Earl Scott, Pratt, Kans.

Application April 7, 1952, Serial No. 280,945

1 Claim. (Cl. 32—33)

This invention relates to dental instruments, particularly a device for removing saliva from a patient's mouth, and has for its principal object to provide a device of this character which holds cotton rolls to protect the tongue and cheek of a patient, for example, while the saliva is being evacuated.

Other objects of the invention are to provide a simple, light weight device adapted for use on either side of the mouth; to provide the device with a support to hold the suction nozzles in proper position within the mouth; and to provide perforated suction tubes on which cotton rolls are applied.

In accomplishing these and other objects of the invention hereinafter pointed out, I have provided improved structure, the preferred form of which is illustrated in the accompanying drawing wherein:

Fig. 1 is a perspective view of a device for removing saliva and showing mounting of the cotton rolls on the suction nozzles of the device.

Fig. 2 is a vertical section through the device on the line 2—2 of Fig. 4.

Fig. 3 is an enlarged section through one of the suction nozzles.

Fig. 4 is a front elevational view of the device.

Referring more in detail to the drawings:

1 designates an instrument through which saliva is removed from a patient's mouth when being worked upon by a dentist and which includes a tubular shank or stem 2 terminating in a fork 3 having diverging branches 4 and 5. The branches 4 and 5 are tubular to provide passageways 6 and 7 for connection with the passageway 8 in the shank 2. The branches 4 and 5 have goose-neck portions 9 and 10 terminating in forwardly extending, substantially parallel suction nozzle portions 11 and 12. The suction nozzle portions 11 and 12 have rounded ends as indicated at 13 (Fig. 3) to facilitate sliding application of the cotton rolls 14 and 15. The nozzle portions have an end perforation 16 and rows of perforations 17 that are spaced about the circumference thereof as best shown in Figs. 2 and 3, so as to provide inlets into the passageway leading through the tubular branches and through the tubular stem 2 into a flexible suction tube 18 that is connected with an ejector device (not shown).

The tubular branches 4 and 5 may be connected with the tubular stem 2 in any suitable manner, as by welding or soldering them into the slightly flattened end 19 of the stem. The gooseneck portions are of suitable curvature to fit over the lip and front teeth when the suction nozzle portions are inserted in the mouth to extend along the inner and outer sides of the alveolar ridge as shown in Fig. 1.

The device is retained in stable position within the mouth by means of a plate 20 that is adapted to engage under the jaw of the patient and is secured to the stem by a suitable clamping device 21. The plate 20 is of substantially rectangular shape and is curved transversely to somewhat conform with the shape of the jaw. The projecting end has rounding corners 22 while the opposite end curves inwardly as at 23 and 24 and terminates in a substantially U-shape clamp guide 25 having spaced parallel portions 26 and 27 connected by a web portion 28. The portions 26 and 27 have registering openings 29 and 30 for loosely passing the stem 2 therethrough and through an opening 31 in a clamping block 32 that is retained between the portions 26 and 27.

The clamp block 32 is drawn toward the web portion 28 to effect a grip between the edges of the openings 29 and 30 in the plate portions 26 and 27 and the stem 2. The clamp block 32 is actuated by a thumb nut 33 that is threadedly engaged with a threaded stem 34 fixed to the clamp block and projecting through an opening 35 in the web portion 28. It is obvious that when the thumb nut 33 is turned to tighten it on the threaded stem 34, the clamp block 32 shifts the stem 2 against sides of the openings 29 and 30 to effect a grip therewith so that the plate 20 may be retained in any adjusted position on the stem 2.

In applying the device, the cotton rolls 14 and 15 are sleeved over the projecting ends of the nozzle portions and the nozzle portions are inserted through the mouth of the patient so that the cotton rolls are positioned along the alveolar ridge, one between the teeth and the cheek and the other between the teeth and tongue. The plate 20 is then raised on the stem 2 and into engagement with the underside of the patient's jaw, after which the thumb screw is tightened to fix the plate relatively to the suction nozzles whereby the device is retained in proper working position. The saliva is drawn from the patient's mouth when suction is applied by means of the ejector through the cotton rolls and through apertures of the nozzles.

It is obvious that the cotton rolls first take up the saliva or moisture, and then the moisture is drawn therefrom through the suction nozzles. It is also obvious that the cotton rolls protect the cheek and tongue of the patient while the saliva is being removed.

The device, being symmetrical on the respective sides of the stem 2, is adapted for use in either side of the patient's mouth.

From the foregoing, it is obvious that I have provided a simple, light weight device for removing saliva from a patient's mouth and which is equipped for retaining rolls of cotton to protect the cheek and tongue of the patient.

What I claim and desire to secure by Letters Patent is:

A device for removing saliva from the mouth of a patient, said device being of the type comprising a tubular stem adapted for connection with an ejector and having diverging tubular branches terminating in suction nozzles adapted for support along the respective sides of the alveolar ridge of the patient's mouth, an absorbent material covering each suction nozzle to protect the cheek and tongue of the patient, and a plate having adjustable support on the tubular stem for engaging under the jaw of the patient to retain said suction nozzles in position relatively to the sides of the alveolar ridge, said plate having a chin portion provided with a substantially flat shank portion and a downwardly extending web portion connected with a substantially flat terminal portion to form a guideway therebetween with sides and end thereof opposite said web portion being open, a rectangular slide block in said guideway and having opposite faces slidably engaging said faces of the shank and terminal portions, said slide block and said shank and terminal portions having openings passing the tubular stem, a threaded stem having connection with the slide block and projecting through an opening in said web portion, and a thumb nut on the threaded stem and having a portion engaging the web portion of said plate to shift the slide block with the opening therein out of coaxial registry with the openings of the shank and terminal portions to effect a clamping pressure on opposite sides of said tubular stem for retaining the plate in an adjusted position relatively to said tubular shank portion for retaining the suction nozzles in position on the respective sides of the alveolar ridge.

JOSEPH EARL SCOTT.

References Cited in the file of this patent

UNITED STATES PATENTS

| Number | Name | Date |
|---|---|---|
| 1,742,080 | Jones | Dec. 31, 1929 |

FOREIGN PATENTS

| Number | Country | Date |
|---|---|---|
| 836,522 | France | Oct. 17, 1938 |